US010859999B2

(12) United States Patent
Kishida

(10) Patent No.: US 10,859,999 B2
(45) Date of Patent: Dec. 8, 2020

(54) NUMERICAL CONTROLLER

(71) Applicant: FANUC CORPORATION, Yamanashi (JP)

(72) Inventor: Yuuji Kishida, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 131 days.

(21) Appl. No.: 16/021,364

(22) Filed: Jun. 28, 2018

(65) Prior Publication Data

US 2019/0011896 A1    Jan. 10, 2019

(30) Foreign Application Priority Data

Jul. 10, 2017    (JP) .................................. 2017-134737

(51) Int. Cl.
*G05B 19/402*    (2006.01)
(52) U.S. Cl.
CPC .. *G05B 19/402* (2013.01); *G05B 2219/37506* (2013.01); *G05B 2219/50353* (2013.01)
(58) Field of Classification Search
CPC ........ G05B 19/402; G05B 2219/50353; G05B 2219/37506; G05B 19/4155
See application file for complete search history.

(56) References Cited

U.S. PATENT DOCUMENTS

2013/0253695 A1    9/2013  Iuchi et al.

FOREIGN PATENT DOCUMENTS

| JP | 2000-153482 | A |   | 6/2000 |          |
|----|-------------|---|---|--------|----------|
| JP | 2000153482  | A | * | 6/2000 | ... G09F 3/00 |
| JP | 2003025263  | A |   | 1/2003 |          |
| JP | 2015107138  | A |   | 6/2015 |          |
| WO | 2012101789  | A1|   | 8/2012 |          |

OTHER PUBLICATIONS

Tricept product description by Parallel Kinematics Machine [online], Apr. 2009 [retrieved Dec. 30, 2019]. Retrieved from <http://www.pkmtricept.com/productos/index.php?id=en&Nproduct=1240415079> (Year: 2009).*
Japanese Decision to Grant a Patent for Japanese Application No. 2017-134737, dated Jul. 2, 2019 with translation, 5 pages.

* cited by examiner

*Primary Examiner* — Thomas C Lee
*Assistant Examiner* — Charles Cai
(74) *Attorney, Agent, or Firm* — RatnerPrestia

(57) ABSTRACT

A numerical controller for controlling a machine tool having a parallel link mechanism specifies a commanded position and a commanded posture of a tool by analyzing a program command, corrects the commanded posture while maintaining the commanded position when a combination of the specified commanded position and commanded posture is not feasible, and outputs the commanded position and the corrected posture which has been corrected to the machine tool. In this way, machining in the unrealizable region is realised by the machine tool having the parallel link mechanism.

4 Claims, 6 Drawing Sheets

NUMERICAL CONTROLLER

CROSS-REFERENCE TO RELATED APPLICATIONS

This application is a new U.S. Patent Application that claims benefit of Japanese Patent Application No. 2017-134737, filed Jul. 10, 2017, the disclosure of this application is being incorporated herein by reference in its entirety for all purposes.

BACKGROUND OF THE INVENTION

1. Field of the Invention

The present invention relates to a numerical controller, and particularly relates to a numerical controller that realizes machining in an unrealizable region of a tool center point using a machine tool having a parallel link mechanism.

2. Description of the Related Art

Machine tools each having a parallel link mechanism in which a plurality of links are connected in parallel have been known. FIG. 1A and FIG. 1B are a perspective view and a schematic view illustrating an example of a 5-axis machine tool of a parallel link mechanism. This 5-axis machine tool positions a tool 3 and performs machining using three extensible link axes 1A, 1B, and 1C and two orthogonal rotating axes 2 (a master rotating axis 2A and a slave rotating axis 2B).

As illustrated in FIG. 2, the machine tool having such a parallel link mechanism may have a crossover offset parallel to the slave rotating axis 2B. The crossover offset refers to a distance from the master rotating axis 2A to a distal end of the tool 3. When the crossover offset is present, there is a combination of a tool position and a tool posture that the machine tool cannot realizes. In an example of FIG. 2, it is impossible to set the distal end of the tool in a cylindrical unrealizable region (a region to which a tool center point may not be brought) 10 while maintaining the illustrated tool posture. As illustrated in FIG. 3, if the extensible link axes 1A to 1C are moved (for example, the extensible link axis 1C is contracted) to move the tool 3, the distal end of the tool may be set in the unrealizable region 10. However, the tool posture tilts accordingly.

In a conventional numerical controller, in some cases, an alarm is issued when a combination of a tool position and a tool posture that may not be realized by a machine tool having a parallel link mechanism is commanded.

Japanese Patent Application Laid-Open No. 2000-153482 discloses a robot controller that recalculates, when input positioning data fails outside a motion range of an axis of a robot, another positioning data satisfying a predetermined constraint condition.

However, in some cases, it is desirable to relax a commanded condition within a certain range and continue machining even when it is impossible to perform machining as per a command.

In addition, a technology described in the above-mentioned Japanese Patent Application Laid-Open No. 2000-153482 relates to a robot, and fails to disclose a specific control method necessary tor a parallel link mechanism.

SUMMARY OF THE INVENTION

The invention has been conceived to solve such problems, and an object of the invention is to provide a numerical controller that realizes machining in an unrealizable region in a machine tool having a parallel link mechanism.

A numerical controller according to the embodiments is a numerical controller for controlling a machine tool having a parallel link mechanism, including a command analysis unit for specifying a commanded position and a commanded posture of a tool by analyzing a program command, a correction command calculation unit for calculating a corrected posture obtained by correcting the commanded posture while maintaining the commanded position, in case where a combination of the commanded position and the commanded posture is not feasible, and a command output unit for outputting the commanded position and the corrected posture to the machine tool.

The correction command calculation unit may be configured to set the commanded position on an outer peripheral of an unrealizable region in which the combination of the commanded position and the commanded posture is not feasible and calculate the corrected posture.

The machine tool may have a master rotating axis and a slave rotating axis orthogonal to each other, the slave rotating axis may hold the tool in an axial direction parallel to the master rotating axis, and the unrealizable region in which the combination of the commanded position and the commanded posture is not feasible may correspond, to a cylindrical region whose radius is a distance between the master rotating axis and a distal end of the tool.

The command output unit may output the commanded position and the corrected posture to the machine tool when the combination of the commanded position and the commanded posture is not feasible, and output the commanded position and the commanded posture to the machine tool when the combination is feasible.

According to the present invention, it is possible to provide a numerical controller that realizes machining in an unrealizable region in a machine tool having a parallel link mechanism.

DETAILED DESCRIPTION OF THE PREFERRED EMBODIMENTS

Figure 1A:
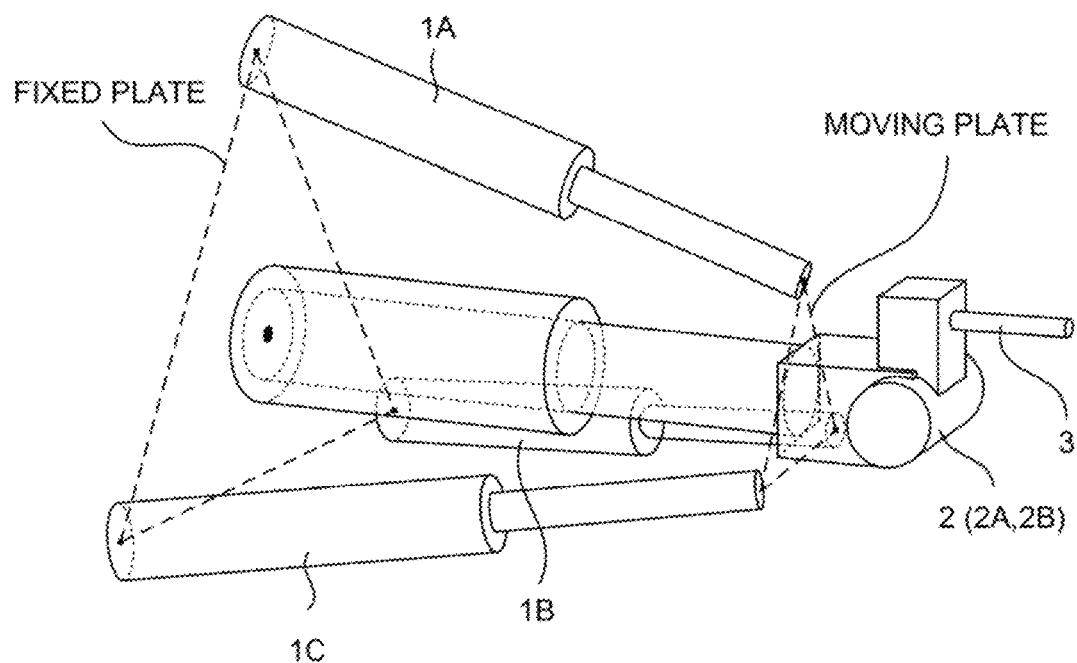
FIG. 1A and FIG. 1B are diagrams illustrating an example of a machine tool having a parallel link mechanism.
Figure 1B:
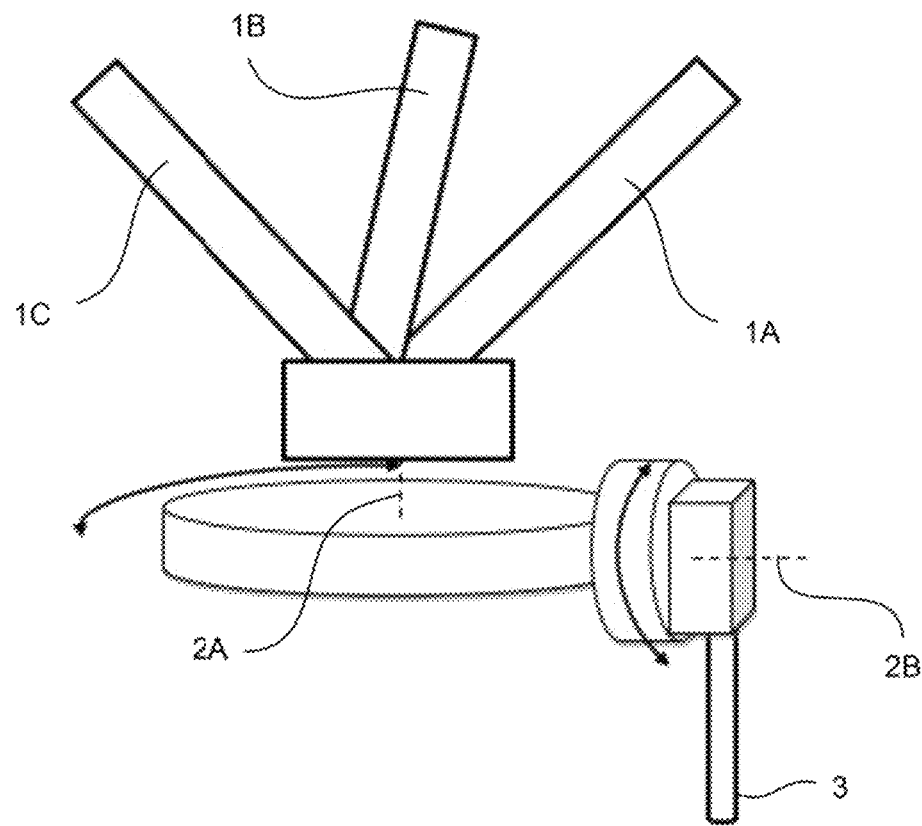
Figure 2:
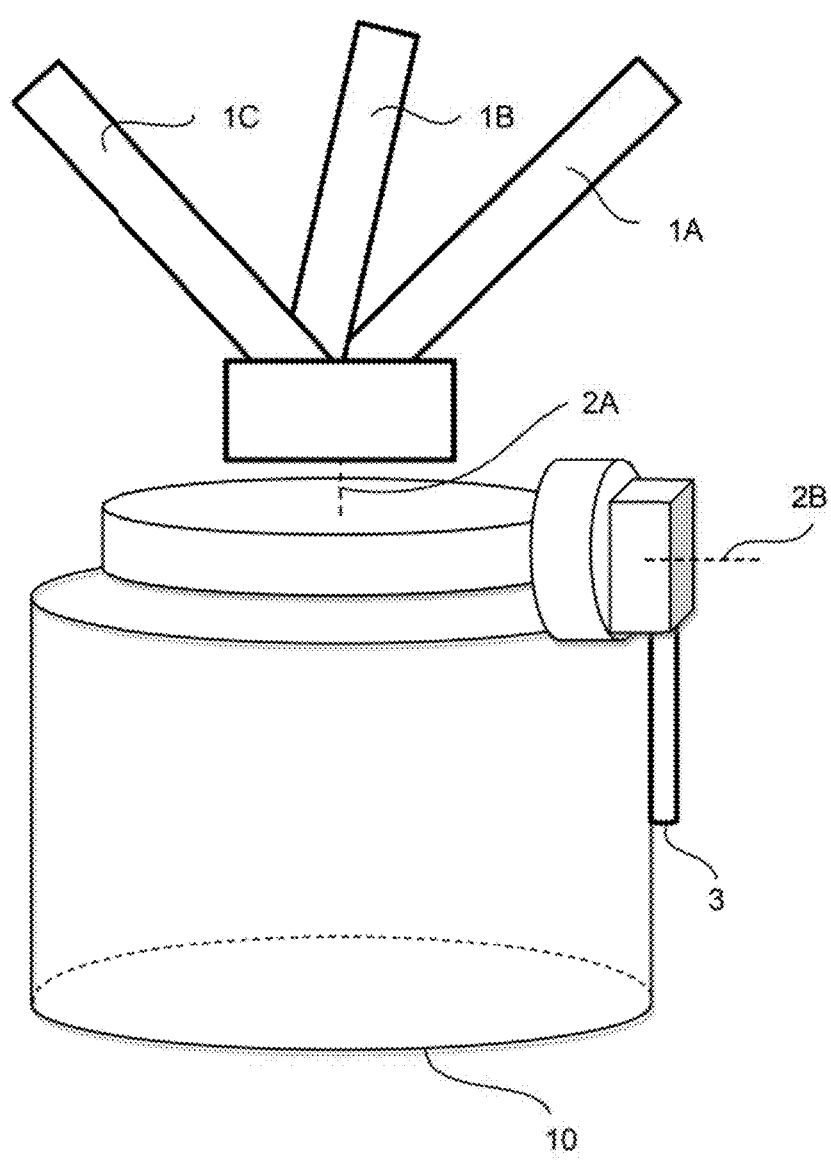
FIG. 2 is a diagram illustrating an example of the machine tool having the parallel link mechanism.
Figure 3:
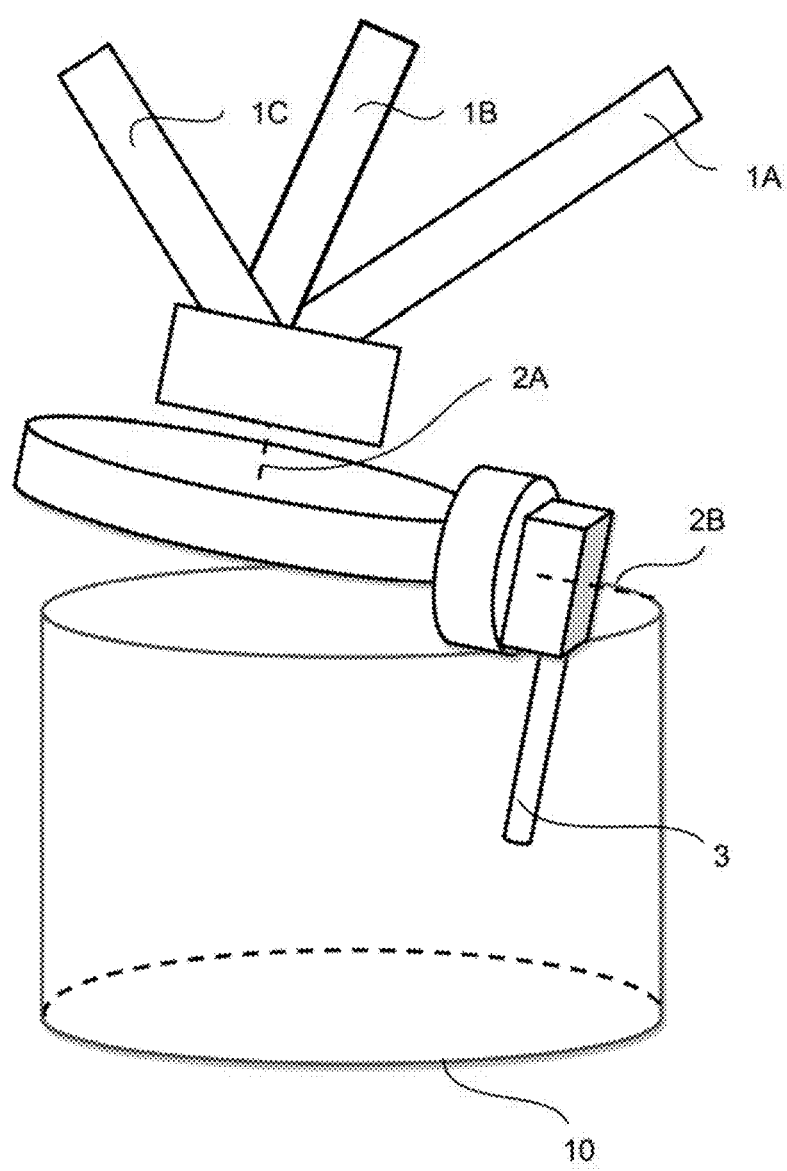
FIG. 3 is a diagram illustrating an example of the machine tool having the parallel link mechanism.
Figure 4:
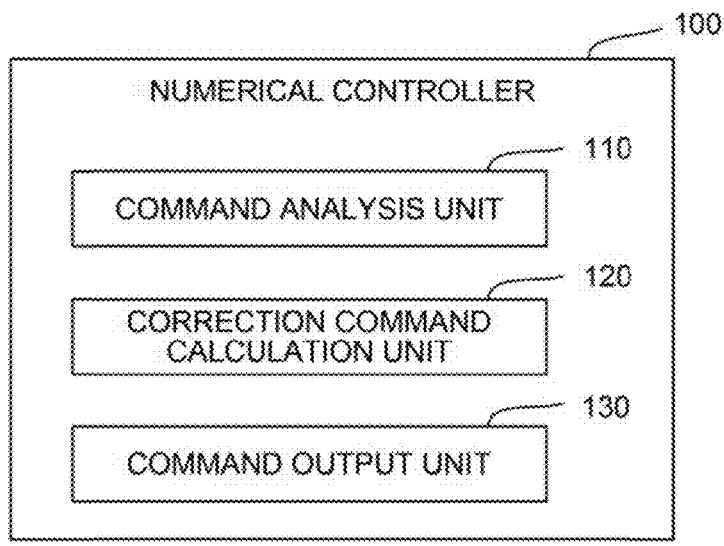
FIG. 4 is a block diagram illustrating a configuration of a numerical controller.

FIG. 4 is a block diagram illustrating a functional configuration of a numerical controller 100.

The numerical controller 100 is a device that controls a machine tool (not illustrated) and typically includes a central processing unit (CPU), a storage device, an input/output device, etc. When the CPU reads and executes a program stored in the storage device, a predetermined function (for example, each processing unit described below) is logically realized. The numerical controller 100 includes a command analysis unit 110, a correction command calculation unit 120, and a command output unit 130 as processing units.

The command analysis unit 110 analyses a given program command and performs a process of specifying a commanded position and a commanded posture of one tool. Since this process is well known, a detailed description thereof will be omitted.

The correction command calculation unit 120 determines whether a combination of the commanded position and the commanded posture of the tool is feasible or not. Since this determination process is well known, a detailed description thereof will be omitted. When such combination is not feasible, the correction command calculation unit 120 calculates a corrected posture obtained by correcting the commanded posture while maintaining the commanded position of the tool. That is, in the case of the present embodiment, machining is continued by changing an axial direction of the tool 3 without changing a distal end point of the tool 3.

A scheme of calculating the corrected posture will be described with reference to FIG. 5.

Figure 5:
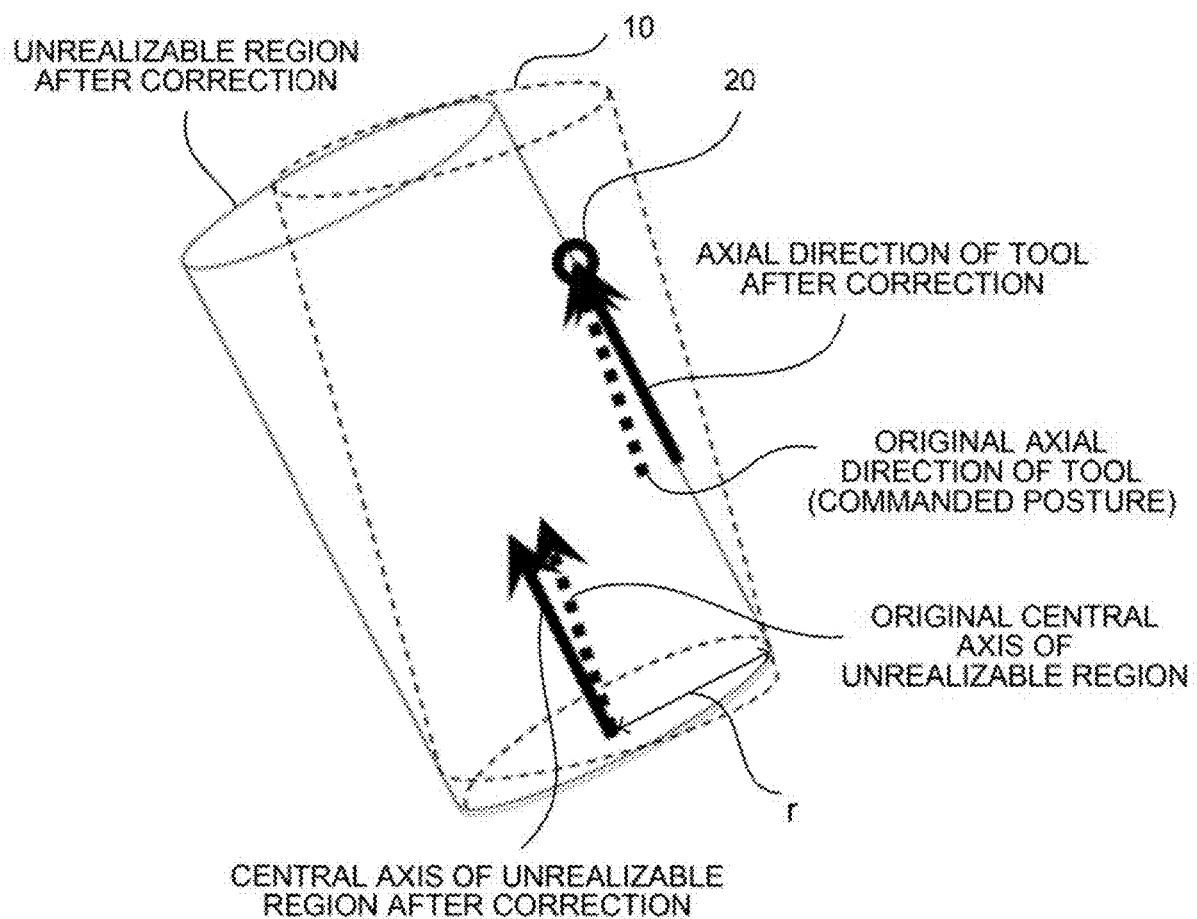
FIG. 5 is a diagram for description of an example of a corrected posture calculation process.

A shape of the unrealizable region 10 is a cylinder as indicated by a dotted line of FIG. 5, a direction of a central axis thereof is parallel to the axial direction of the tool 3, and a radius r is a crossover offset. When the axial direction of the tool 3 is shifted, the cylindrical unrealizable region 10 rotates, and eventually the commanded position is exposed to the outside of the unrealizable region 10. In particular, it is efficient to correct the axial direction of the tool 3 so that a commanded position 20 rests on an outer surface of the cylindrical unrealizable region 10.

Figure 6:
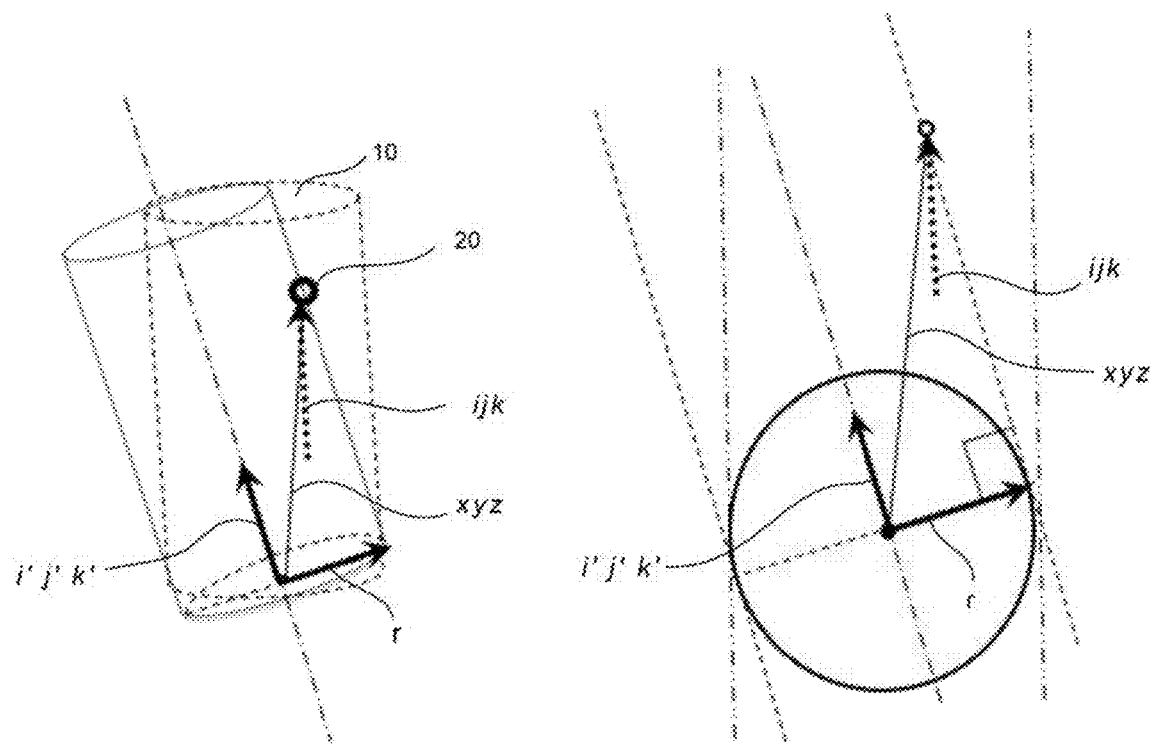
FIG. 6 is a diagram for description, of an example of the corrected poseurs calculation process.

A method of calculating an efficient corrected posture will be described with reference to FIG. 6.

A constraint condition of the efficient corrected posture is expressed as below using a commanded position xyz, a commanded posture ijk, and a corrected posture i'j'k'. v, a, and b are primary variables. xyz, ijk, i'j'k', and v correspond to vectors, and the other variables correspond to scalars. A center of a bottom surface of the unrealizable region 10 is set as an origin of XYS coordinates.

$$v=r \quad (1)$$

$$v \cdot i'j'k'=0 \quad (2)$$

$$v+i'j'k'=xyz \quad (3)$$

$$av+bijk=xyz \quad (4)$$

A vector v of a length r (=crossover offset) indicating a radius of the bottom surface of the unrealizable region is defined (Expression (1)). The axial direction i'j'k' of the tool after correction is parallel to the central axis of the unrealizable region and orthogonal to the vector v (Expression (2)). A vector xyz up to the commanded position 20 is expressed by a sum of the vector v and the vector i'j'k' (Expression 3)). The vector v, the vector ijk, and the vector xyz are on the same plane (Expression (4)).

The correction command calculation unit 120 can calculate the efficient corrected posture in which the commanded position 20 rests on the outer surface of the cylindrical unrealizable region by obtaining the corrected posture i'j'k' satisfying the above Expression (1) to Expression (4). Unknowns in the above Expression (1) to Expression (4) correspond to v, a, b, and i'j'k', and eight solutions can be established. The correction command calculation unit 120 can adopt an arbitrary solution as a final corrected posture. For example, a solution in which a correction angle of a tool axis is the smallest may be selected. Alternatively, a solution in which an angle of the tool with respect to a workplace falls within a predetermined threshold value may be selected.

The correction command calculation unit 120 may output an alarm when the correction angle of the tool axis is larger than a predetermined threshold value. The correction command calculation unit 120 outputs an alarm in a case in which the correction angle of the tool axis is not the predetermined threshold value or less even when the correction angle is smallest in a solution. In this way, it is possible to prevent the posture from being unintentionally greatly corrected.

When a combination of the commanded position and the commanded posture of the tool is feasible, the command output unit 130 outputs the commanded position and the commanded posture to the machine tool as commands. When the combination is not feasible, the commanded position and the corrected posture are output to the machine tool as commands.

Figure 7:
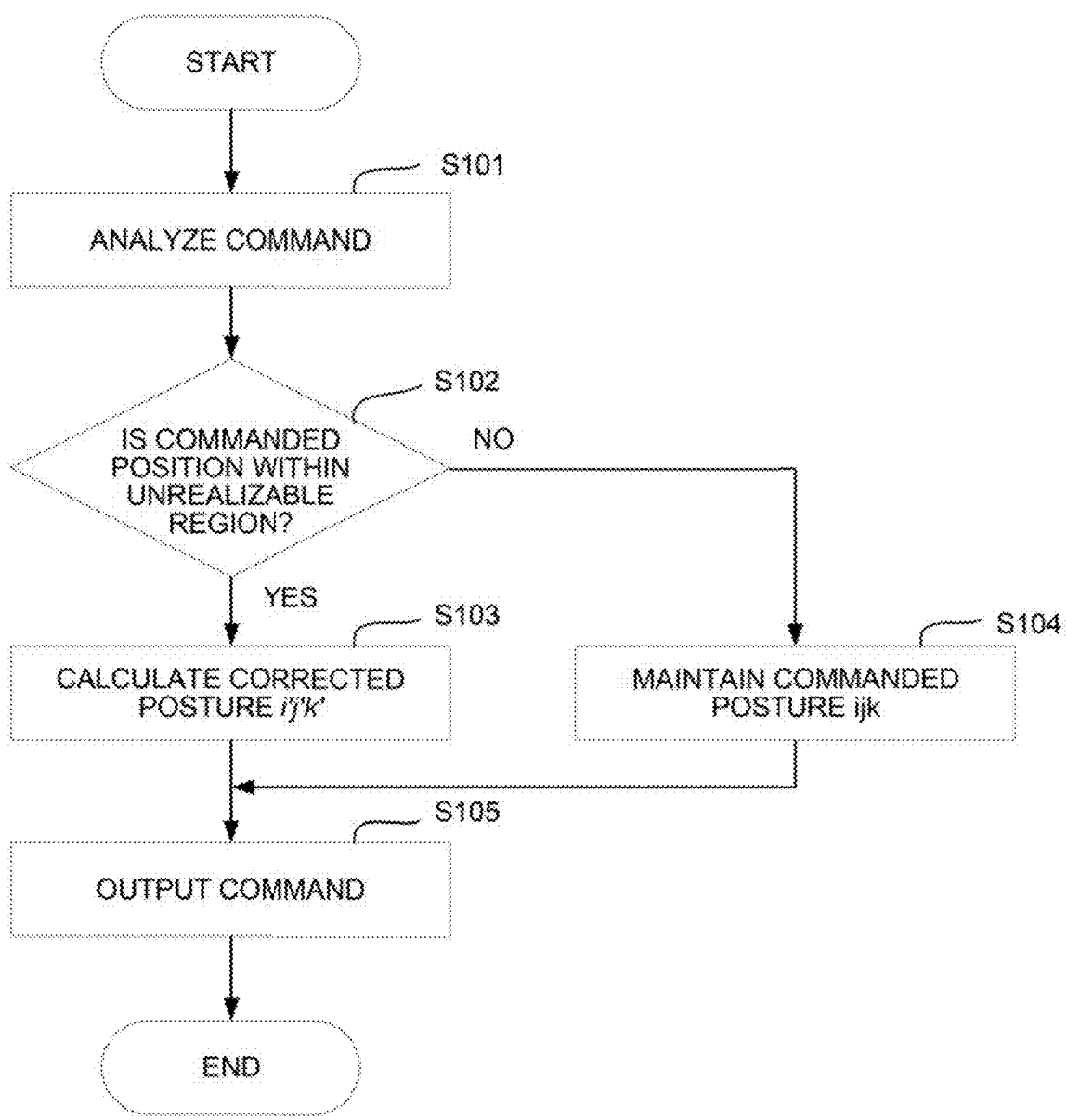
FIG. 7 is a flowchart illustrating an operation of the numerical controller.

An operation of the numerical controller 100 will be described using a flowchart of FIG. 7.

Step S101: The command analysis unit 110 analyses a given program command and specifies the commanded position and the commanded posture of the tool.

Step S102: The correction command calculation unit 120 determines whether the commanded position is within the unrealizable region or not. When the commanded position is within the unrealizable region, that is, when the combination of the commanded position and the commanded posture of the tool is not feasible, the process proceeds to step S103. Otherwise, the process proceeds to step S104.

Step S103: The correction command calculation unit 120 calculates the corrected posture obtained by correcting the commanded posture without changing the commanded position of the tool. When the corrected posture does not satisfy a predetermined condition, an alarm may be output.

Step S104: The correction command calculation unit 120 does not calculate the corrected posture. The commanded posture is maintained without change.

Step S105: The command output unit 130 outputs, to the machine tool, the commanded position and the corrected posture when a corrected position is calculated, or the commanded position and a commanded posture when the corrected position is not calculated.

According to the present embodiment, even when the commanded position is within the unrealizable region, the numerical controller 100 can continue machining by calculating and outputting the corrected posture obtained by correcting the commanded posture. Even when it is impossible to perform machining as per a command, machining may be performed by relaxing a condition commanded within a certain range.

Even though the embodiments have been described above, the embodiments are not limited only by examples of the above-described embodiments, and can be implemented in various modes by making appropriate changes.

For example, in the above-described embodiment, an example has been shown in which the commanded posture is corrected, and the corrected posture is calculated so that the commanded position rests on the outer surface of the cylindrical unrealizable region. However, the embodiments are not limited thereto. For example, the commanded position may be placed at an arbitrary point on the outside of the cylindrical unrealizable region, and the corrected posture may be calculated. In this way, in some cases, it is possible to realize a tool posture suitable for some special conditions.

For example, it is possible to ensure cutting ability by giving a contact angle at which a core of the tool does nor come into contact with the workpiece.

The invention claimed is:

1. A numerical controller for controlling a machine tool having a parallel link mechanism and also having two orthogonal rotating axes to work on a workpiece, in which the machine tool having the parallel link mechanism has a crossover offset based on mounting positions of the rotating axes, the numerical controller comprising:
   a command analysis unit for specifying a commanded position and a commanded posture of a tool by analyzing a program command;
   a correction command calculation unit for calculating a corrected posture obtained by correcting only the commanded posture while maintaining the commanded position when a combination of the commanded position and the commanded posture of the tool is not feasible due to presence of the crossover offset, wherein an axial direction of the tool is changed without changing a distal end point of the tool; and
   a command output unit for outputting the commanded position and the corrected posture to the machine tool, wherein the corrected posture comprises an angle of the tool with respect to the workpiece falling within a predetermined threshold value.

2. The numerical controller according to claim 1, wherein the correction command calculation unit is configured to set the commanded position on an outer peripheral of an unrealizable region in which the combination of the commanded position and the commanded posture is not feasible and calculate the corrected posture.

3. The numerical controller according to claim 1,
   wherein the two orthogonal rotating axes include a master rotating axis and a slave rotating axis,
   the slave rotating axis holds a tool in an axial direction parallel to the master rotating axis, and
   an unrealizable region in which the combination of the commanded position and the commanded posture is not feasible corresponds to a cylindrical region whose radius is a distance between the master rotating axis and a distal end of the tool.

4. The numerical controller according to claim 1, wherein the command output unit is configured to output the commanded position and the corrected posture to the machine tool when the combination of the commanded position and the commanded posture is not feasible, and output the commanded position and the commanded posture to the machine tool when the combination is feasible.

* * * * *